United States Patent [19]

Robb

[11] Patent Number: 5,687,022

[45] Date of Patent: *Nov. 11, 1997

[54] MID-WAVE INFRARED LENS SYSTEM WITH LIQUID OPTICAL ELEMENT

[75] Inventor: Paul Newell Robb, Sunnyvale, Calif.

[73] Assignee: Lockheed Missiles & Space Company, Inc., Sunnyvale, Calif.

[*] Notice: The term of this patent shall not extend beyond the expiration date of Pat. No. 5,491,583.

[21] Appl. No.: 506,103

[22] Filed: Jul. 24, 1995

[51] Int. Cl.⁶ .............. G02B 1/06; G02B 3/12; G02B 13/14

[52] U.S. Cl. .............. 359/356; 359/358; 359/665

[58] Field of Search .............. 359/356, 357, 359/358, 665

[56] References Cited

U.S. PATENT DOCUMENTS

| | | | |
|---|---|---|---|
| 4,958,919 | 9/1990 | Sigler | 350/418 |
| 5,020,889 | 6/1991 | Mercado | 350/463 |
| 5,033,831 | 7/1991 | Sigler | 350/418 |
| 5,491,583 | 2/1996 | Robb | 359/356 |

OTHER PUBLICATIONS

Kate Rouse, The First Time Collector's Guide To Classic Cameras, 1994, p. 60 (No Month).

*Primary Examiner*—Jon W. Henry
*Attorney, Agent, or Firm*—Feix & Feix; Henry Groth; Mark Bielawski

[57] ABSTRACT

A lens system with a liquid optical element is for use in the mid-wave infrared from 3.0 micron to 5.0 micron wavelength is described. Using a liquid optical element which is highly transmissive in the 3.0 micron to 5.0 micron waveband of interest in conjunction with a solid material which is also highly transmissive in that waveband provides a lens design with very good optical performance which is less expensive and which is much lighter in weight than an all solid design of the same optical performance.

10 Claims, 9 Drawing Sheets

FIG_1

FIG_2

FIG_3

FIG_4

FIG_5

FIG_6

NORMALIZED APERTURE HEIGHT

WAVELENGTHS (μ)
- 4.0000 ———
- 3.5000 — — —
- 4.5000 —·—·—
- 3.0000 —··—··—
- 6.0000 ———

OPTICAL PATH DIFFERENCE (WAVELENGTHS)

FIG_7

RMS WAVEFRONT ERROR

WAVELENGTH (μ)

FIG_8

FIG_9

FIG_10

NORMALIZED APERTURE HEIGHT

WAVELENGTHS (μ)
- 4.0000 ———
- 3.5000 -------
- 4.5000 —·—·—·—
- 3.0000 — — — —
- 6.0000 ———————

OPTICAL PATH DIFFERENCE (WAVELENGTHS)

FIG_11

RMS WAVEFRONT ERROR

WAVELENGTH (μ)

FIG_12

1

MID-WAVE INFRARED LENS SYSTEM WITH LIQUID OPTICAL ELEMENT

TECHNICAL FIELD

This invention relates generally to optical systems that are well-corrected for chromatic aberration in the mid-wave infrared 3.0 micron to 5.0 micron region of the electromagnetic spectrum.

This invention relates particularly to optical systems which exhibit substantially diffraction-limited performance (i.e., which have a Strehl ratio greater than 0.60) over a continuous infrared wavelength band from 3.0 micron to 5.0 micron.

BACKGROUND OF THE INVENTION

In order to design an optical system so as to have a specified degree of correction for chromatic aberration, it is necessary to use an appropriate combination of optical materials for the refractive elements of the system. A technique is described in U.S. Pat. No. 5,020,889 for identifying appropriate combinations of optical materials to use in designing optical systems that are to have a specified degree of color correction.

Techniques are described in U.S. Pat. Nos. 4,958,919 and 5,033,831 for selecting combinations of liquids and glasses for use as the lens elements of optical systems that are to be well-corrected for chromatic aberration.

Unless an appropriate combination of optical materials is used for the refractive elements of an optical system, it would not be possible to achieve a specified degree of correction for chromatic aberration for the system. However, the selection of an appropriate combination of optical materials is not a sufficient condition for achieving the specified degree of correction for chromatic aberration. In addition to using an appropriate combination of optical materials, the designer must also determine an appropriate design form for the system—i.e., an appropriate set of geometrical relationships for the refractive elements that comprise the system.

Until recently, techniques as described in the above-cited references for selecting appropriate combinations of optical materials for use in designing optical systems that are corrected for chromatic aberration over specified wavelength ranges had generally not been applied to the design of lens systems incorporating a liquid optical element in the mid-wave 3.0 micron to 5.0 micron infrared wavelength band, because there has been practically a complete absence of refractive index measurements at those infrared wavelengths for optically useful liquids.

Recent collaboration between researchers at the Lockheed Palo Alto Research Laboratories in Palo Alto, Calif., and the Vavilov State Optical Institute in St. Petersburg, Russia, has resulted in the measurement of refractive indices for a number of liquids at infrared wavelengths. The data obtained has made possible the use of liquids to design optical systems that are well-corrected for chromatic aberration over the mid-wave 3.0 micron to 5.0 micron infrared wavelength region of the electromagnetic spectrum.

The above-noted U.S. Pat. Nos. 5,020,889; 4,958,919; and 5,033,831 are incorporated by reference in this application.

SUMMARY OF THE INVENTION

It is an object of the present invention to provide design forms for lens systems that are well-corrected for chromatic aberration and that provide substantially diffraction-limited performance over the mid-wave infrared 3.0 micron to 5.0 micron region of the electromagnetic spectrum.

It is a specific object of the present invention to provide design forms for lens systems using a liquid lens element to achieve correction for chromatic aberration over the mid-wave infrared 3.0 micron to 5.0 micron region of the electromagnetic spectrum.

It is another specific object of the invention to reduce the cost and weight of lenses in the three to five micron infrared spectral region by using a suitable liquid optical element in the design. This permits the design to use only the least expensive and lightweight solid lens elements.

It is a related object to achieve the required degree of correction of the monochromatic and chromatic aberrations in the 3.0 micron to 5.0 micron infrared spectral region without requiring the use of optical materials which are expensive and heavy. This 3.0 micron to 5.0 micron mid-wave infrared spectral region is a passband which is of particular interest because it is a passband which is not blocked by normal atmospheric conditions and is a passband which is widely used in surveillance.

The present invention is disclosed in terms of a number of exemplary embodiments of lens systems in which the specified liquid lens element material is carbon tetrachloride. Carbon tetrachloride is identified by the code designation "459487" in the United States Mil Spec system for identifying optical materials.

Lens system apparatus and methods which embody the features noted above and which are effective to function as disclosed above constitute further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

First Embodiment

Figure 1:
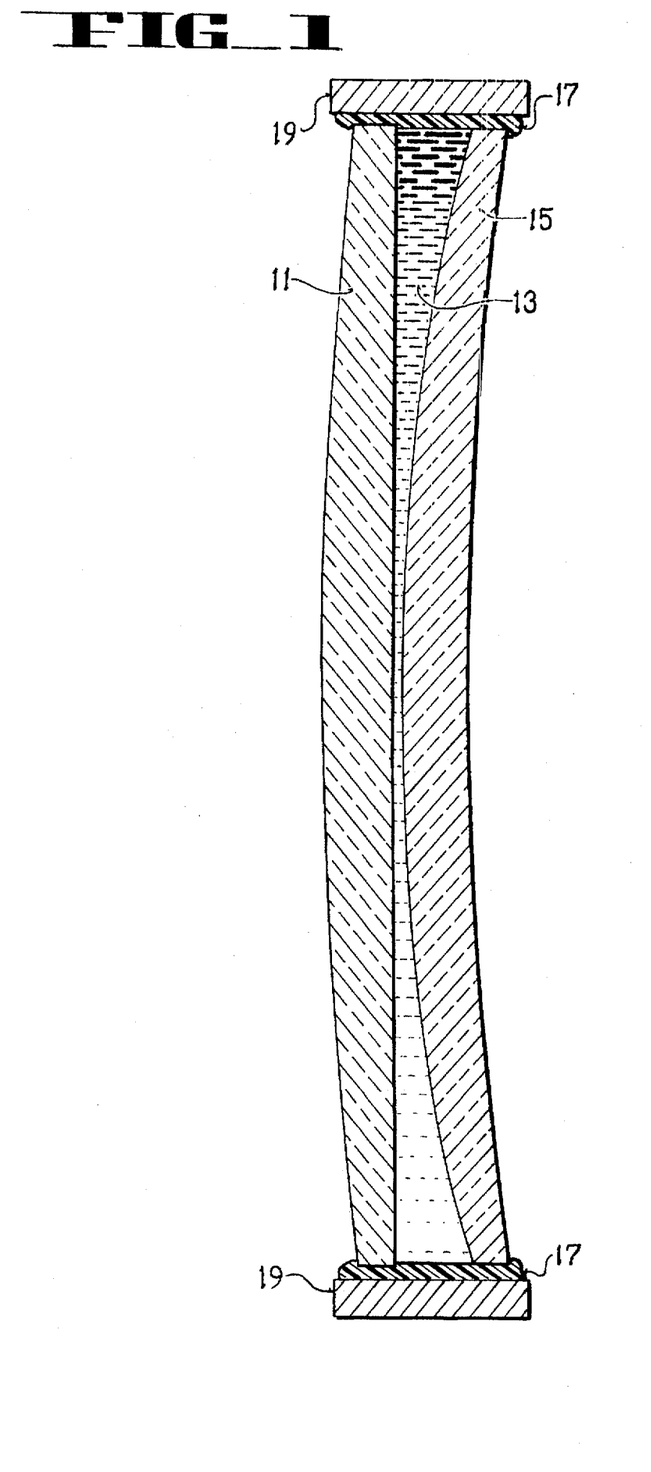
FIG. 1 is a profile drawing of a first embodiment of a lens triplet according to the present invention, which comprises a liquid lens element consisting of carbon tetrachloride contained between two solid lens elements made of Zinc Selenide (ZnSe).

In FIG. 1, a first embodiment of a lens triplet according to the present invention is illustrated in which a first Zinc Selenide (ZnSe) lens element 11 forms one side of a container for a liquid lens element 13 and a second Zinc Selenide lens element 15 forms another side of the container for the liquid lens element 13.

The Zinc Selenide lens elements 11 and 15 are coaxially disposed along an optical axis, and the elements 11 and 15 are mounted so as to contain the liquid lens element 13 between the solid, rigid lens elements 11 and 15.

The mounting of the solid lens elements 11 and 15 and containment of the central liquid lens element 13 may be accomplished by using a flexible inert adhesive material 17, for example, fluorosilicone, to pot or to bond the lens elements inside a tube 19 of suitable solid material, for example, an aluminum material.

One kind of fluorosilicone material which can be employed is X36141 material from Dow Corning of Midland, Mich. The flexibility of the sealing material permits effective liquid containment under expansion conditions caused by temperature fluctuations without the need for reservoir.

A technique for mounting a pair of solid lens elements so as to contain a liquid lens elements between the solid lens elements is disclosed in co-pending U.S. patent application Ser. No. 08/014,596 filed on Feb. 8, 1993 and assigned to the same assignee as the assignee of this application.

This U.S. patent application Ser. No. 08/014,596 filed on Feb. 8, 1993, now U.S. Pat. No. 5,446,591 issued Aug. 29, 1995, is incorporated by reference in this application.

The Zinc Selenide lens elements 11 and 15 can be obtained, for example, from Cleveland Crystals, Inc., Cleveland Ohio and/or Harshaw Chemical Company, Solon, Ohio.

The liquid lens element 13 consists of carbon tetrachloride.

In accordance with the U.S. Mil Spec system for identifying optical materials, carbon tetrachloride is identified by the code designation "459487", which indicates an index of refraction of 1.459 (to the third decimal place) and an Abbe number of 48.7 (to the first decimal place) at the wavelength of the Sodium d spectral line—i.e., at 0.5893 micron.

The lens triplet shown in FIG. 1 has an optical prescription (i.e., a design form) specified in tabular format as follows:

TABLE I

| Surface No. | Radius (inches) | Thickness (inches) | Index of Refraction | Material |
|---|---|---|---|---|
| 1 | 1.532582 | 0.020000 | 2.433139 | ZnSe |
| 2 | 6.744201 | 0.002000 | 1.442761 | 459487 |
| 3 | 0.689976 | 0.020000 | 2.433139 | ZnSe |
| 4 | 1.141648 | 0.980637 | | AIR | where the surfaces of the lens elements are numbered consecutively from left to right along the optic axis in accordance with optical design convention.

Thus, surface No. 1 is the left surface of the first Zinc Selenide lens element 11.

Surface No. 2 is the right surface of the first Zinc Selenide lens element 11 and the left surface of the liquid carbon tetrachloride lens element 13.

Surface No. 3 is both the right surface of the carbon tetrachloride lens element 13 and the left surface of the second Zinc Selenide lens element 15.

The aperture stop is at surface No. 1.

The radius listed for each lens surface in Table I is the radius of curvature expressed in inches.

In accordance with convention, the radius or curvature is positive if the center of curvature of the surface lies to the right of the surface, and the radius of curvature is negative if the center of curvature of the surface lies to the left of the surface.

The thickness listed for each lens surface is the thickness expressed in inches of the lens element bounded on the left by the surface. The thickness of each lens element is measured along the optic axis.

The column headed "Index of Refraction" in Table I refers to the index of refraction of the lens element bounded on the left by the indicated surface at the 4.00 micron wavelength.

The material listed for each surface in Table I refers to the type of material bounded on the left by that surface.

The index of refraction of an optical material varies with wavelength.

The indices of refraction for the two different materials comprising the lens elements 11, 13 and 15 of the lens triplet of FIG. 1 at five representative mid-wave infrared wavelengths in the range from 3.0 micron to 6.0 micron (i.e., $N_1$ at 4.0000 micron; $N_2$ at 3.5000 micron; $N_3$ at 4.5000 micron; $N_4$ at 3.0000 micron; and $N_5$ at 6.0000 micron) are tabulated as follows:

TABLE II

| Surface No. | $N_1$ | $N_2$ | $N_3$ | $N_4$ | $N_5$ |
|---|---|---|---|---|---|
| 1 | 2.433139 | 2.435152 | 2.431299 | 2.437568 | 2.425834 |
| 2 | 1.442761 | 1.443944 | 1.441389 | 1.444979 | 1.435782 |
| 3 | 2.433139 | 2.435152 | 2.431299 | 2.437568 | 2.425834 |

It is instructive to evaluate the performance of the lens triplet of FIG. 1 at each of the above specified mid-wave infrared wavelengths.

A graphical indication of performance of a lens system at a particular wavelength is provided by a plot of optical path difference as a function of normalized aperture height for the specified wavelength.

Figure 2:
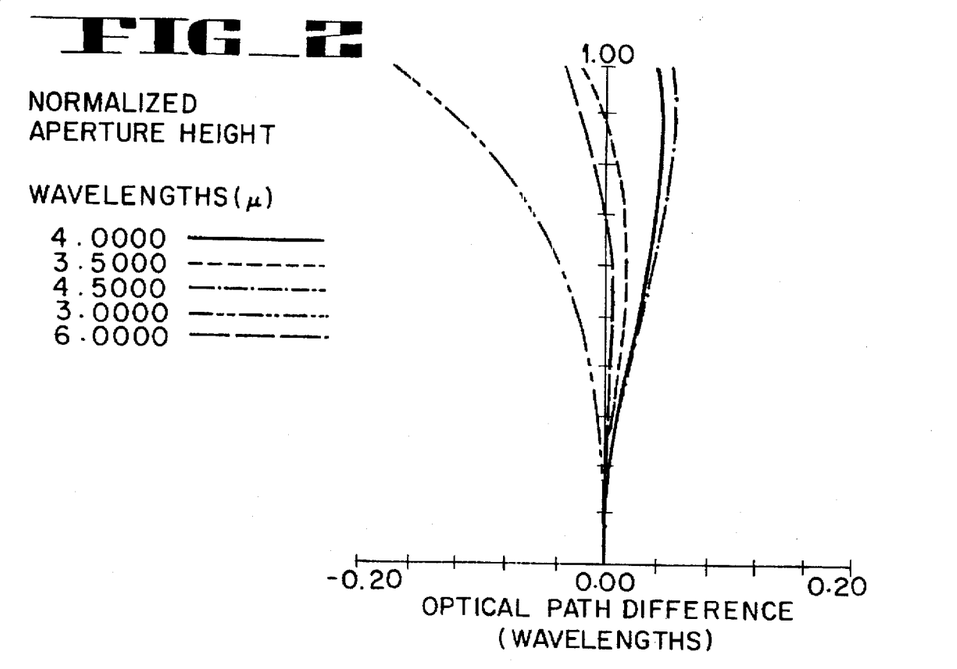
FIG. 2 is a plot of optical path difference as a function of normalized aperture height at five different infrared wavelengths for the lens triplet of FIG. 1.

In FIG. 2, plots of optical path difference as a function of normalized aperture height are shown for the lens triplet of FIG. 1 for each of the same five mid-wave infrared wavelengths for which indices of refraction are listed in Table II.

It can be determined from the curves in FIG. 2 that maximum optical path difference for the lens triplet of FIG. 1 throughout the wavelength range of 3.0 micron to 6.0 micron is less than $\lambda/5.3$ (i.e., 0.19 wavelengths) on any point of the aperture.

Figure 3:
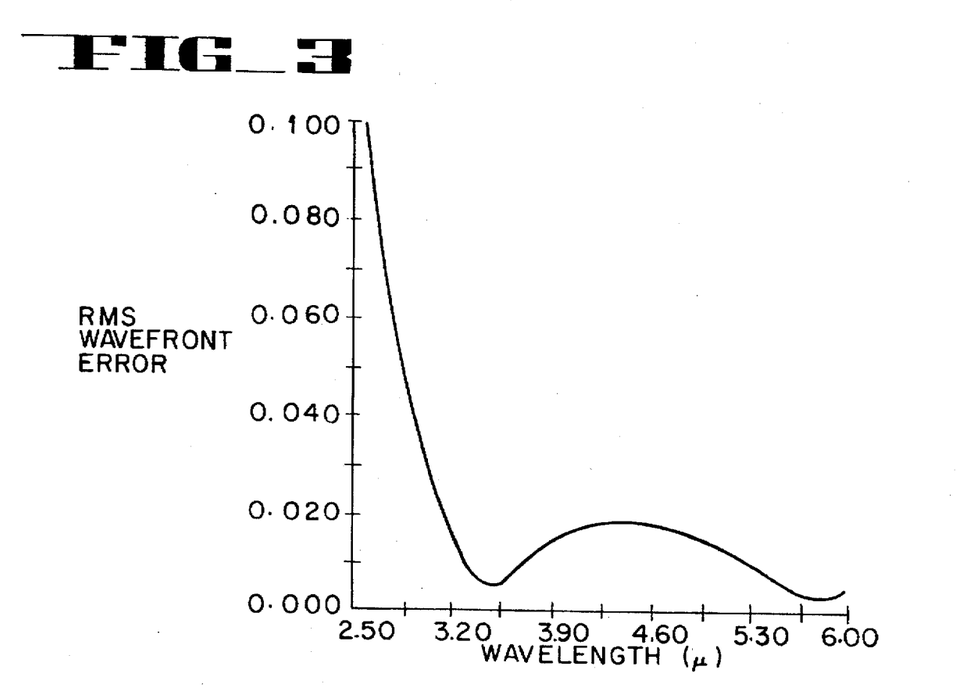
FIG. 3 is a plot of root-mean-square (RMS) wavefront error as a function of wavelength over a waveband extending from the 2.50 micron wavelength through the 6.0 micron wavelength in the mid-wave infrared region of the electromagnetic spectrum.

In FIG. 3, the root-mean-square (RMS) wavefront error of the lens triplet of FIG. 1 is plotted as a function of wavelength throughout the mid-wave infrared 2.5 to 6.0 micron region of the electromagnetic spectrum.

It is apparent from FIG. 3 that the lens triplet of FIG. 1 is well-corrected for chromatic aberration over the 3.0 to 5.0 micron mid-wave infrared pass band of interest.

This 3.0 micron to 5.0 micron mid-wave infrared spectral region is a passband which is of particular interest because it is a passband which is not blocked by normal atmospheric conditions and is a passband which is widely used in surveillance.

Figure 4:
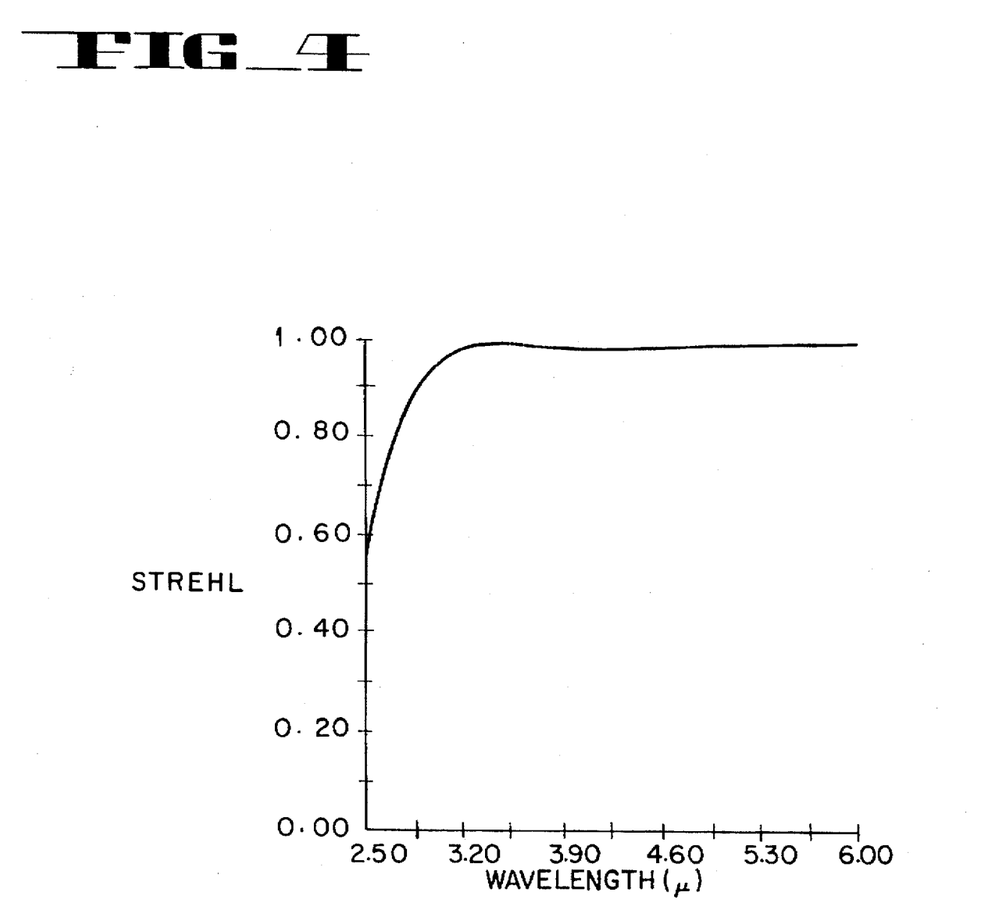
FIG. 4 is a plot of Strehl ratio as a function of wavelength over the same wavelength band as specified in FIG. 3 for the lens triplet of FIG. 1.

As illustrated in FIG. 4, the Strehl ratio for the lens triplet of FIG. 1 is virtually unchanged and has a Strehl ratio approaching 1.0 throughout the major portion of the 3.0 micron to 5.0 micron wavelength band. The Strehl ratio is greater than 0.9 at all wavelengths in this 3.0 micron to 5.0 micron waveband.

A Strehl ratio of 0.60 or greater provides optical performance which is so good that the difference between perfect optical performance and optical performance at a Strehl ratio of 0.60 or greater cannot readily be detected.

The optical performance of a lens system having a Strehl ratio equal to or better than 0.60 is an optical performance which is equivalent to substantially diffraction limited optical performance.

The lens triplet of FIG. 1 has been designed particularly for use at the mid-wave infrared 3.0 micron to 5.0 micron region. It is, however, a noteworthy advantage of the lens triplet of FIG. 1 that the lens system is also transparent to visible wavelengths, which simplifies the alignment and assembly of the lens.

Second Embodiment

Figure 5:
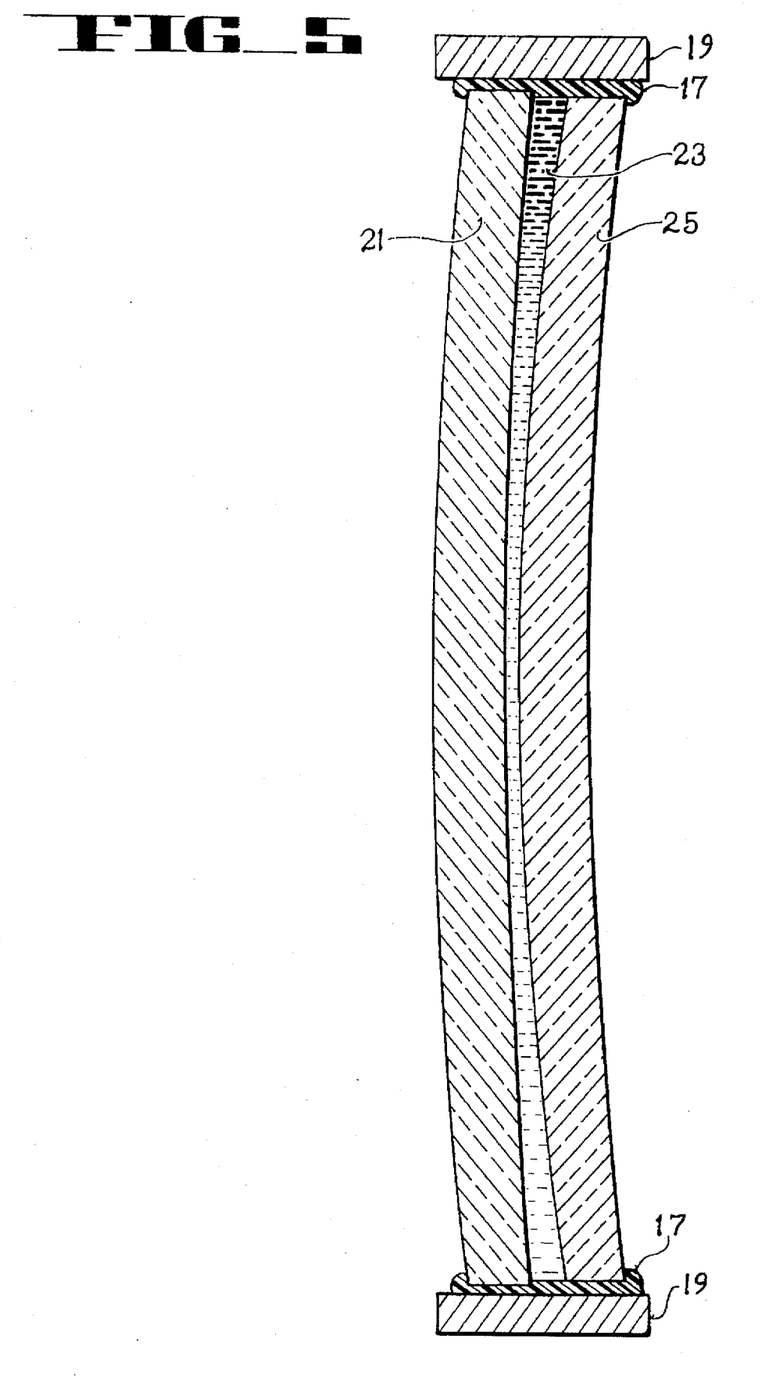
FIG. 5 is a profile drawing of a second embodiment of a lens triplet according to the present invention, which comprises a liquid lens element consisting of carbon tetrachloride contained between two solid lens elements made of AMTIR1.

In FIG. 5, a second embodiment of a lens triplet according to the present invention is illustrated in which a first AMTIR1 element 21 forms one side of a container for a liquid lens element 23, and a second AMTIR1 element 25 forms another side of the container for the liquid lens element 23.

The lens elements 21 and 25 are coaxially disposed along an optic axis, and are mounted so as to contain the liquid lens element 23 between the elements 21 and 25.

The AMTIR1 lens elements 21 and 25 can be obtained from, e.g., Amorphous Materials, Inc., Garland, Tex.

The liquid lens element 23 consists of carbon tetrachloride, which is identified by the code designation "459487" in the U.S. Mil Spec system for identifying optical materials.

The lens triplet shown in FIG. 5 has an optical prescription specified in tabular format as follows:

TABLE III

| Surface No. | Radius (inches) | Thickness (inches) | Index of Refraction | Material |
|---|---|---|---|---|
| 1 | 1.386389 | 0.020000 | 2.514270 | AMTIR1 |
| 2 | 3.449870 | 0.002000 | 1.442761 | 459487 |
| 3 | 0.775139 | 0.020000 | 2.514270 | AMTIR1 |
| 4 | 1.263370 | 0.984564 | | AIR | where the surfaces of the lens elements are numbered consecutively from left to right along the optic axis in accordance with the same optical design convention as described above in connection with the embodiment illustrated in FIG. 1.

The aperture stop is at surface No. 1.

The column headed "Index of Refraction" in Table 1 refers to the index of refraction of the lens element bounded on the left by the indicated surface at the 4.00 micron wavelength.

The indices of refraction for the materials comprising the lens elements 21, 23 and 25 of the lens triplet of FIG. 5 at the same five representative infrared wavelengths for which indices of refraction are listed in Table II are tabulated as follows:

TABLE IV

| Surface No. | $N_1$ | $N_2$ | $N_3$ | $N_4$ | $N_5$ |
|---|---|---|---|---|---|
| 1 | 2.514270 | 2.516398 | 2.512538 | 2.519242 | 2.508322 |
| 2 | 1.442761 | 1.443944 | 1.441389 | 1.444979 | 1.435782 |
| 3 | 2.514270 | 2.516398 | 2.512538 | 2.519242 | 2.508322 |

Figure 6:
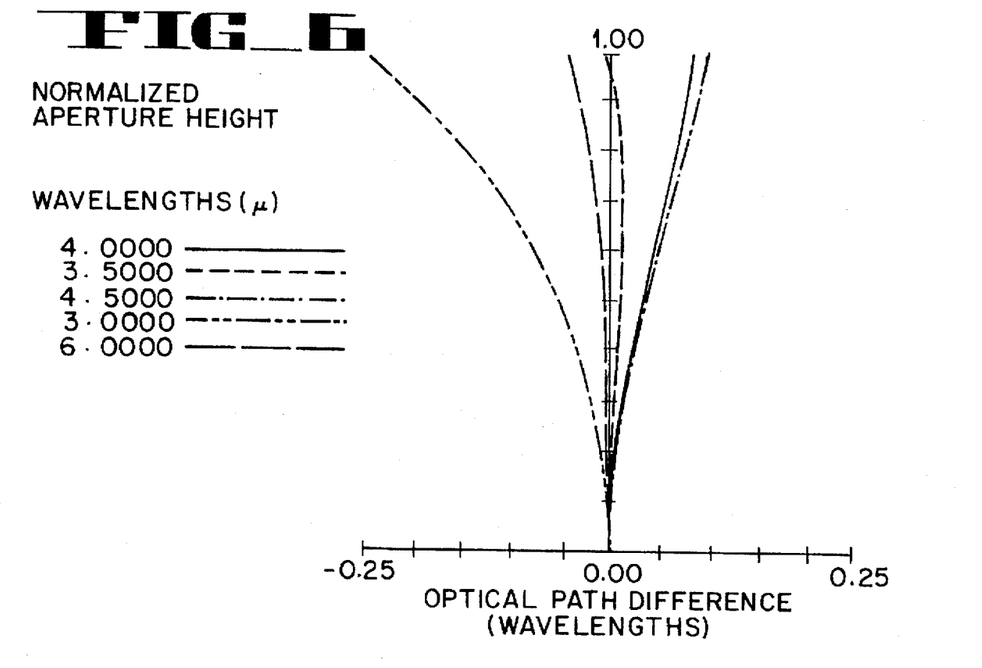
FIG. 6 is a plot of optical path difference as a function of normalized aperture height at five different infrared wavelengths for the lens triplet of FIG. 5.

In FIG. 6, plots of optical path difference as a function of normalized aperture height are shown for the lens triplet of FIG. 5 for each of the same five infrared wavelengths for which indices of refraction are listed in Table II and Table IV.

It can be determined from the curves in FIG. 6 that the maximum optical path difference for the lens triplet of FIG. 5 throughout the wavelength range from 3.0 micron to 5.0 micron is less than $\lambda/4$ (0.25 wavelengths) at any point on the aperture.

Figure 7:
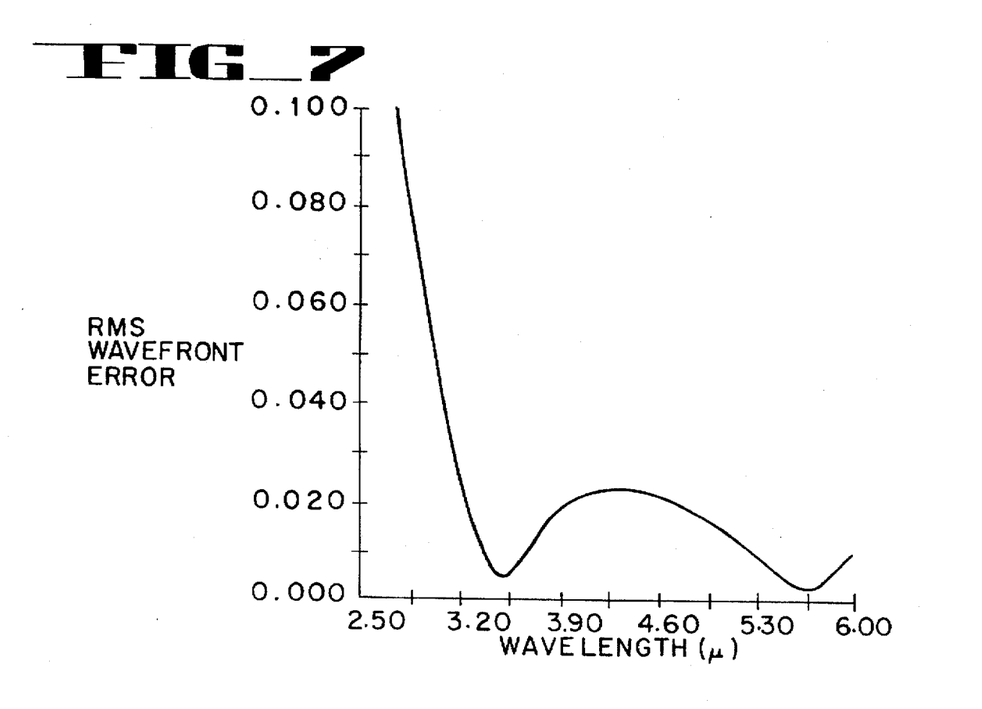
FIG. 7 is a plot of root-mean-square (RMS) wavefront error as a function of wavelength over a waveband extending from the 2.50 micron wavelength through the 6.0 micron wavelength in the mid-wave infrared region of the electromagnetic spectrum.

In FIG. 7, the root-mean-square (RMS) wavefront error of the lens triplet of FIG. 5 is plotted as a function of wavelength throughout the 2.50 micron to 6.0 micron waveband.

It is apparent from FIG. 7 that the lens triplet of FIG. 5 is well-corrected for chromatic aberration over the 3.0 micron to 5.0 micron mid-wave infrared waveband of interest.

The lens triplet of FIG. 5 has a RMS wavefront error less than 0.1 throughout the 3.0 micron to 5.0 micron waveband.

Figure 8:
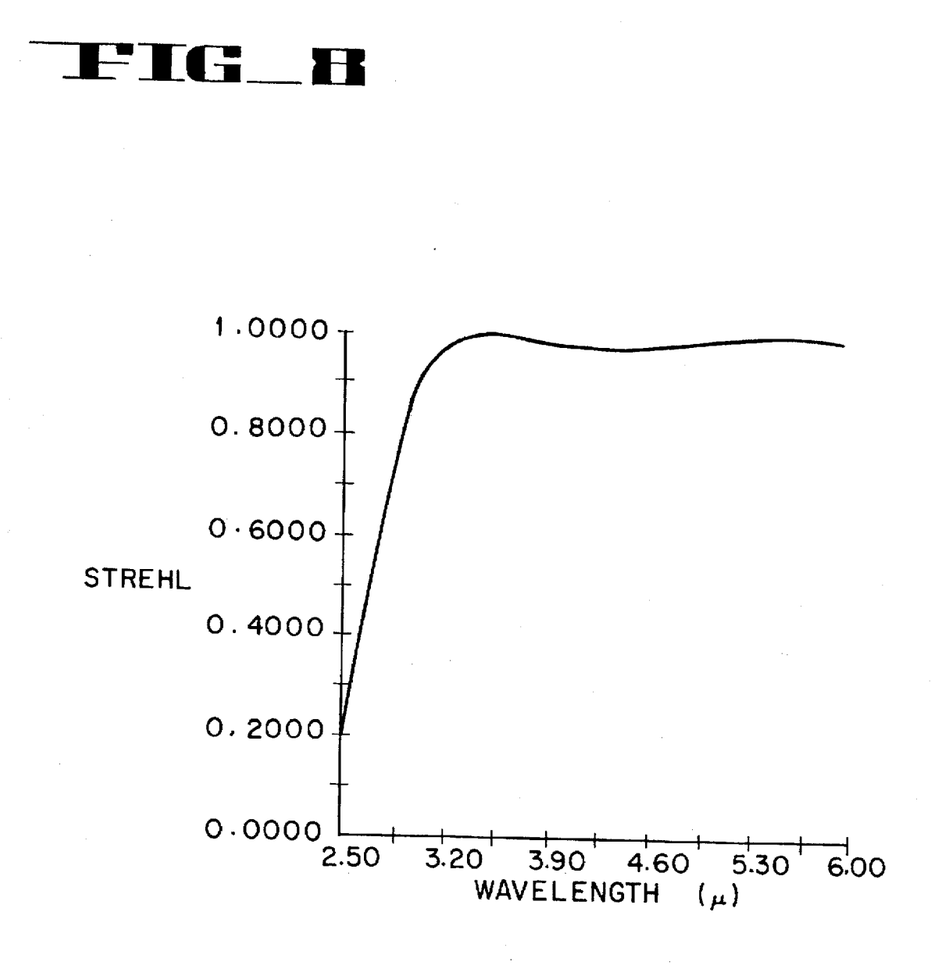
FIG. 8 is a plot of Strehl ratio as a function of wavelength over the same wavelength band as specified in FIG. 7 for the lens triplet of FIG. 5.

In FIG. 8, the Strehl ratio for the lens triplet of FIG. 5 is plotted as a function of wavelength throughout the waveband from 2.5 micron to 6.0 micron.

It is apparent from FIG. 8 that the Sirehi ratio for the lens triplet of FIG. 5 is better than 0.8 at the 3.0 micron wavelength and is near 1.0 from 3.2 micron to 5.0 micron wavelength.

Third Embodiment

Figure 9:
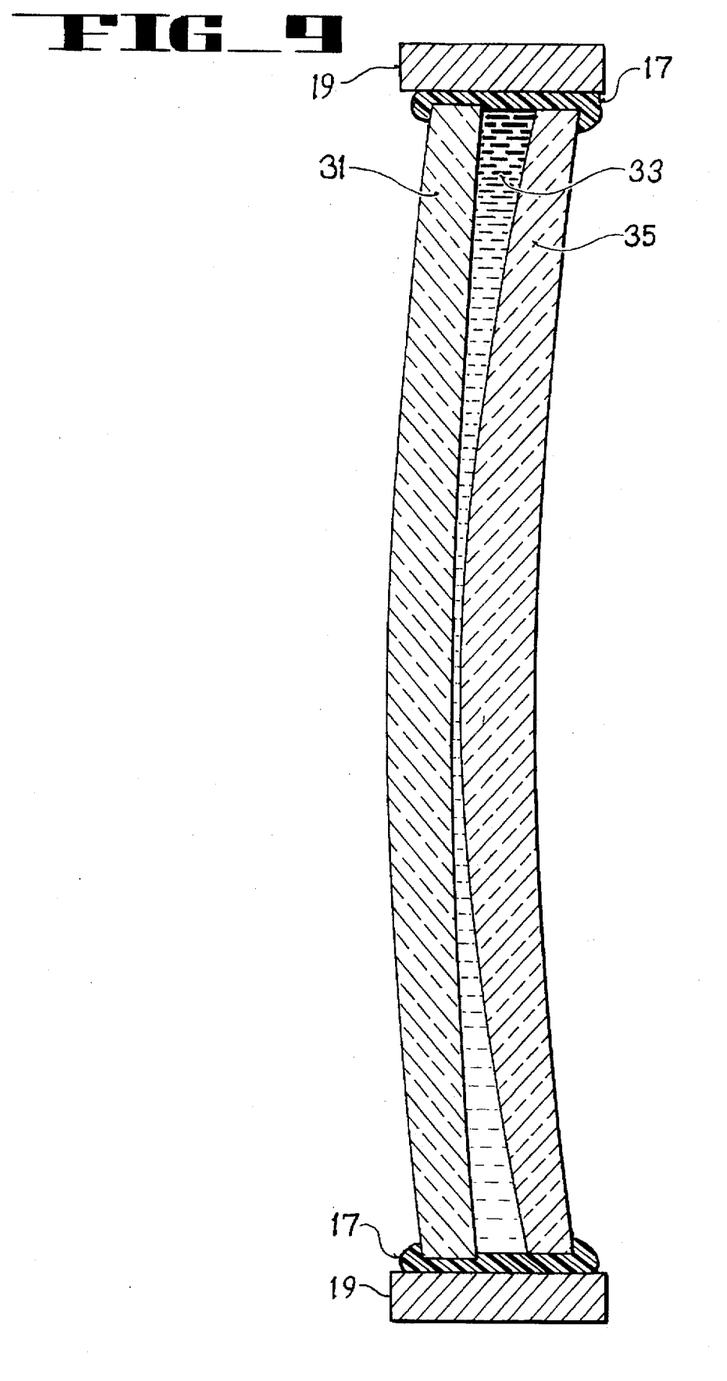
FIG. 9 is a profile drawing of a third embodiment of a lens triplet according to the present invention, which comprises a liquid lens element consisting of carbon tetrachloride contained between two solid lens elements made of silicon.

In FIG. 9, a third embodiment of a lens triplet according to the present invention is illustrated in which a first silicon lens element 31 forms one side of a container for a liquid lens element 33 and a second silicon lens element 35 forms another side of the container for the liquid lens element 32.

The silicon lens elements 31 and 35 are coaxially disposed along an optic axis, and are mounted so as to contain the liquid lens element 33 between the liquid lens elements 31 and 35.

The silicon lens elements 31 and 35 can be obtained from, e.g., Cleveland Crystals, Inc., Cleveland, Ohio.

The liquid lens element 33 consists of carbon tetrachloride, which is identified by the code designation "459487" in the U.S. Mil Spec system for identifying optical materials.

The lens triplet shown in FIG. 9 has an optical prescription specified in tabular format as follows:

TABLE V

| Surface No. | Radius (inches) | Thickness (inches) | Index of Refraction | Material |
|---|---|---|---|---|
| 1 | 1.635958 | 0.020000 | 3.422873 | SILICN |
| 2 | 2.499021 | 0.002000 | 1.442761 | 459487 |
| 3 | 1.022101 | 0.020000 | 3.422873 | SILICN |
| 4 | 1.452208 | 0.980637 | | AIR | where the surfaces of the lens elements are numbered consecutively from left to right along the optic axis in accordance with the same optical design convention as described above in connection with the embodiment illustrated in FIG. 1.

The aperture stop is at surface Number 1.

The column headed "Index of Refraction" in Table I refers to the index of refraction of the lens element bounded on the left by the indicated surface at the 4.00 micron wavelength.

The indices of refraction for the materials comprising the lens elements 31, 33 and 35 of the lens triplet of FIG. 9 at the same five representative infrared wavelengths for which indices of refraction are listed in Tables II and IV are tabulated as follows:

TABLE VI

| Surface No. | $N_1$ | $N_2$ | $N_3$ | $N_4$ | $N_5$ |
|---|---|---|---|---|---|
| 1 | 3.422873 | 3.425751 | 3.420899 | 3.430179 | 3.417645 |
| 2 | 1.442761 | 1.443944 | 1.441389 | 1.444979 | 1.435782 |
| 3 | 3.422873 | 3.425751 | 3.420899 | 3.430179 | 3.417645 |

Figure 10:
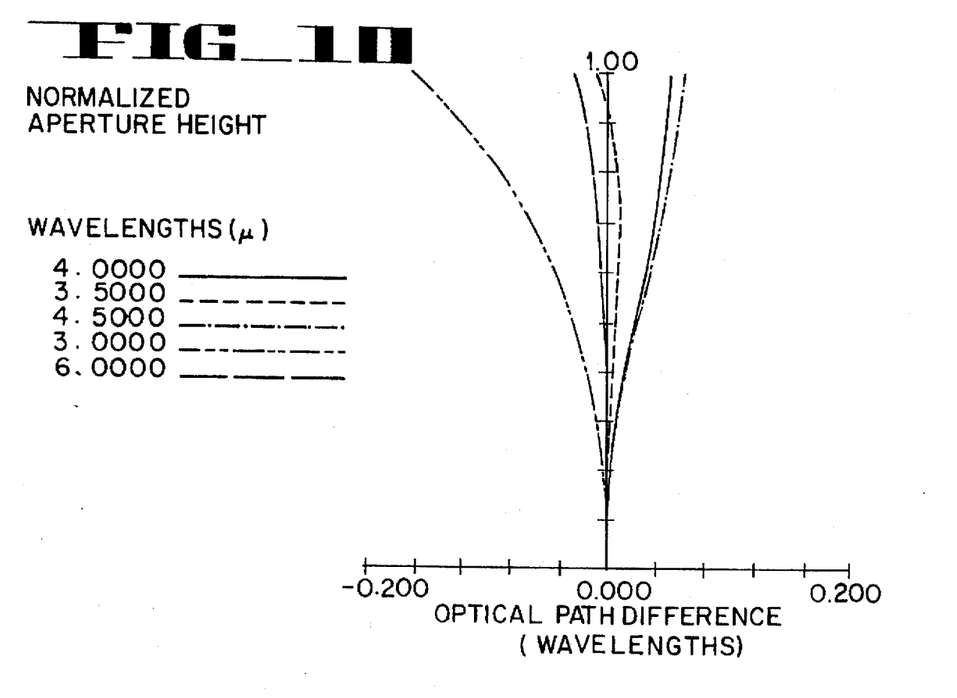
FIG. 10 is a plot of optical path difference as a function of normalized aperture height at five different infrared wavelengths for the lens triplet of FIG. 9.

In FIG. 10, plots of optical path difference as a function of normalized aperture height for the lens triplet of FIG. 9 are shown for each of the five infrared wavelengths listed in Table VI.

It can be determined from the curves in FIG. 10 that the maximum optical path difference for the lens triplet of FIG. 9 throughout the wavelength range from 3.0 micron to 5.0 micron is less than $\lambda/5$ (0.2 wavelengths) at any point on the aperture.

Figure 11:
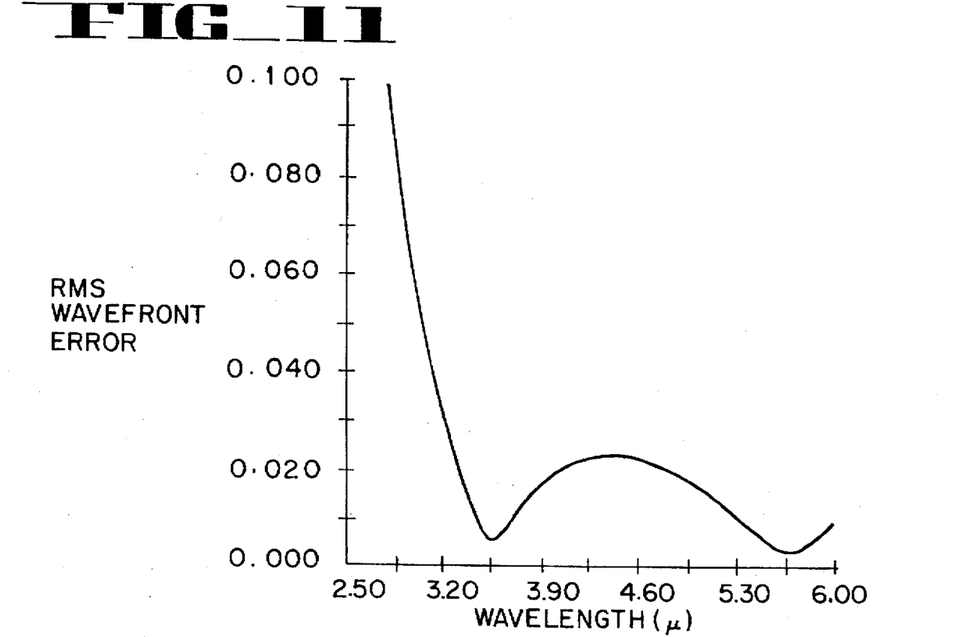
FIG. 11 is a plot of root-mean-square (RMS) wavefront error as a function of wavelength over a waveband extending from the 2.50 micron wavelength through the 6.0 micron wavelength in the mid-wave infrared region of the electromagnetic spectrum of FIG. 9.

In FIG. 11, the root-mean-square (RMS) wavefront error of the lens triplet of FIG. 9 is plotted as a function of wavelength throughout the 2.50 micron through 6.0 micron infrared band of the electromagnetic spectrum.

It is apparent from FIG. 11 that the lens triplet of FIG. 9 is well-corrected for chromatic aberration over the 3.0 micron to 5.0 micron waveband of interest. The RMS wavefront error is less than 0.1 throughout this waveband and for most of the waveband is less than 0.02.

Figure 12:
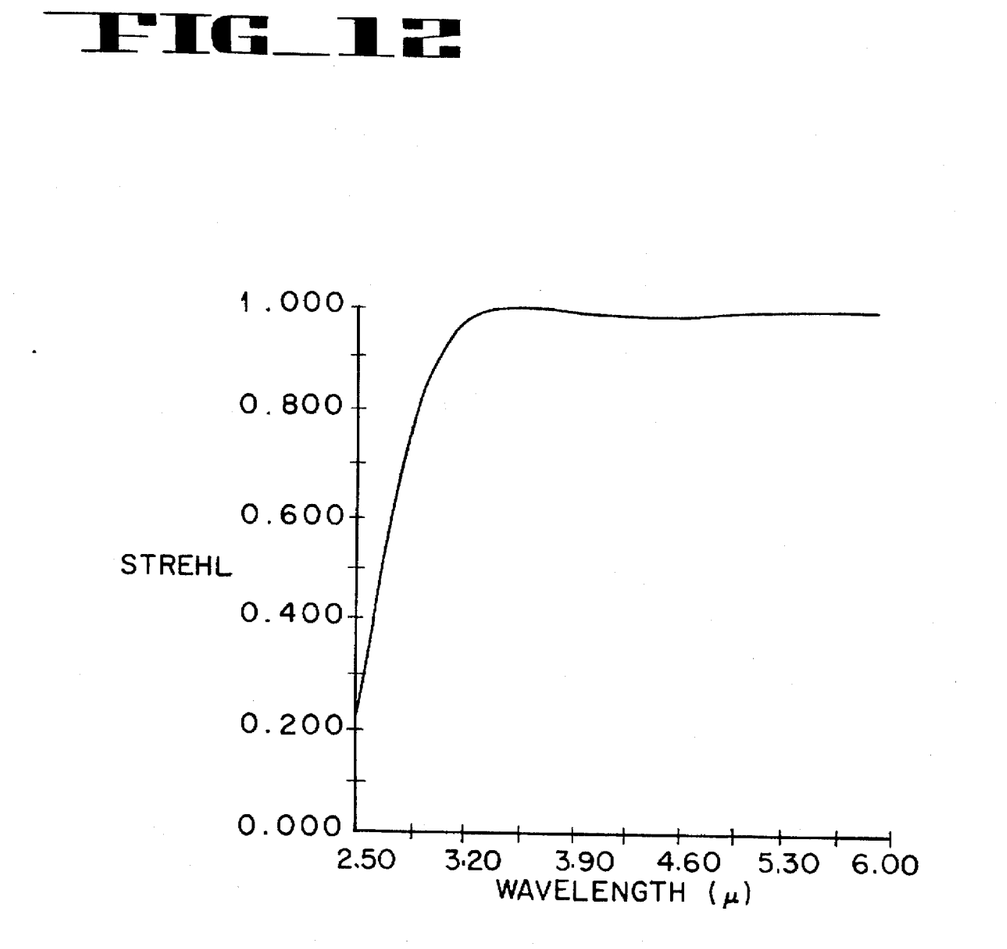
FIG. 12 is a plot of Strehl ratio as a function of wavelength over the same wavelength band as specified in FIG. 11 for the lens triplet of FIG. 9.

In FIG. 12, the Strehl ratio for the lens triplet for FIG. 9 is plotted as a function of wavelength throughout the mid-wave infrared portion of the electromagnetic spectrum from 2.50 micron to 6.00 micron.

It is apparent from FIG. 12 that the Strehl ratio for the lens triplet of FIG. 9 is virtually 1.0 from 3.2 micron to 5.0 micron and is greater than 0.8 from 3.0 micron to 3.20 micron.

As demonstrated by the specific embodiments described above, the present invention provides a new type of lens system for use in the mid-wave infrared (3 to 5 micron) region of the spectrum.

The lens uses a combination of solid and liquid lens elements to achieve substantially diffraction limited performance in the mid-wave infrared spectral region.

The present invention reduces the cost and weight of lenses in the 3 to 5 micron infrared spectral region by using a suitable liquid optical element in the design. The optical element is highly transmissive in the 3 to 5 micron infrared waveband of interest (a waveband widely used for surveillance). This permits the design to use only the least expensive and lightweight solid lens weight elements.

The previously existing lens systems in the mid-wave infrared spectral region used two or more solid infrared materials to achieve the required degree of correction of the monochromatic and chromatic aberrations. Those existing lens systems presented the problems of both (1) the expense of the lens systems, and (2) the increased weight due to the high density of the optical materials.

The present invention, by using a liquid optical element which is highly transmissive in the 3 to 5 micron waveband of interest in conjunction with a solid material which is also highly transmissive in that waveband provides a lens design with very good optical performance which is less expensive and which is much lighter in weight than an all solid design of the same optical performance.

The design of the present invention uses carbon tetrachloride as the liquid optical element, held in a cavity between two solid lenses. In specifically disclosed embodiments of the present invention the solid elements are made of Zinc Selenide, AMTIR1, and Silicon.

Other infrared transmitting solid materials, such as, for example, Zinc Sulfide, Cleartran, Germanium, Sapphire, the Alkali Halides, such as Sodium Chloride, Potassium Bromide, etc., could also be used that are transparent in the spectral region of interest and that have suitable optical mechanical properties.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A lens system for use in the mid-wave infrared 3.0 micron to 5.0 micron region of the electromagnetic spectrum, said lens system comprising a first rigid lens element, a second rigid lens element, and a liquid lens element, said liquid lens element being contained between said first and second rigid lens elements, said first and second rigid lens elements and said liquid lens element co-acting with each other to cause said lens system to produce imagery over a continuous infrared wavelength band from 3.0 micron to 5.0 micron.

2. The lens system of claim 1 wherein said first and second rigid lens elements and said liquid lens element co-act with each other to cause said lens system to have a Strehl ratio greater than 0.60 over a continuous wavelength band extending from 3.0 to 5.0 micron.

3. The lens system of claim 1 wherein the liquid lens element is made of a liquid having infrared transparency continuously through the 3.0 micron to 5.0 micron waveband.

4. The lens system of claim 3 wherein the first and second rigid lens elements are made of solid material(s) having infrared transparency continuously through the 3.0 micron to 5.0 micron waveband.

5. The lens system of claim 3 wherein the liquid lens element is made of carbon tetrachloride.

6. The lens system of claim 5 wherein the first and second rigid lens elements are made of a material selected from a group consisting of ZnSe, Silicon, and AMTIR1.

7. The lens system of claim 1 wherein the first and second rigid lens elements are made of a material selected from a group consisting of ZnSe, Silicon, and AMTIR1.

8. A lens system for use in the mid-wave infrared 3.0 micron to 5.0 micron region of the electromagnetic spectrum, said lens system comprising a first rigid lens element, a second rigid lens element, and a liquid lens element, said liquid lens element being contained between said first and second rigid lens elements, said first and second rigid lens elements and said liquid lens element co-acting with each other to cause said lens system to produce imagery over a continuous infrared wavelength band from 3.0 micron to 5.0 micron, and wherein the liquid lens element is made of a liquid having infrared transparency continuously through the 3.0 micron to 5.0 micron waveband, and wherein the first and second rigid lens elements are made of solid material(s) having infrared transparency continuously through the 3.0 micron to 5.0 micron waveband, and wherein said first and second rigid lens elements and said liquid lens element are configured and positioned with respect to each other according to a design form specified as follows:

| Surface No. | Radius (inches) | Thickness (inches) | Index of Refraction | Material |
|---|---|---|---|---|
| 1 | 1.532582 | 0.020000 | 2.433139 | ZnSe |
| 2 | 6.744201 | 0.002000 | 1.442761 | 459487 |
| 3 | 0.689976 | 0.020000 | 2.433139 | ZnSe |
| 4 | 1.141648 | 0.980637 | | AIR | wherein the surfaces of the optic elements are numbered consecutively from left to right along the optic axis and where the Index of Refraction values listed refer to the index of refraction of the lens element bounded on the left by the indicated surface at the 4.00 micron wavelength.

9. The lens system according to claim 4 wherein said first and a second rigid lens elements and said liquid lens element are configured and position with respect to each other according to a design form specified as follows:

| Surface No. | Radius (inches) | Thickness (inches) | Index of Refraction | Material |
|---|---|---|---|---|
| 1 | 1.386389 | 0.020000 | 2.514270 | AMTIR1 |
| 2 | 3.449870 | 0.002000 | 1.442761 | 459487 |
| 3 | 0.775139 | 0.020000 | 2.514270 | AMTIR1 |
| 4 | 1.263370 | 0.984564 | | AIR | wherein the surfaces of the optic elements are numbered consecutively from left to right along the optic axis and where the Index of Refraction values listed refer to the index of refraction of the lens element bounded on the left by the indicated surface at the 4.00 micron wavelength.

10. The lens system of claim 4 wherein said first and a second rigid lens elements and said liquid lens element are configured and position with respect to each other according to a design form specified as follows:

| Surface No. | Radius (inches) | Thickness (inches) | Index of Refraction | Material |
|---|---|---|---|---|
| 1 | 1.635958 | 0.020000 | 3.422873 | SILICN |
| 2 | 2.499021 | 0.002000 | 1.442761 | 459487 |
| 3 | 1.022101 | 0.020000 | 3.422873 | SILICN |
| 4 | 1.452208 | 0.980637 | | AIR | wherein the surfaces of the optic elements are numbered consecutively from left to right along the optic axis and where the Index of Refraction values listed refer to the index of refraction of the lens element bounded on the left by the indicated surface at the 4.00 micron wavelength.

* * * * *